United States Patent [19]
Frazzini et al.

[11] Patent Number: 5,180,979
[45] Date of Patent: Jan. 19, 1993

[54] POSITION MEASUREMENT SENSOR USING A LINEAR VARIABLE DIFFERENTIAL TRANSFORMER WITH A TRIANGULAR PULSE INPUT AND OUTPUT

[75] Inventors: Ronald M. Frazzini, Plymouth; Rick M. Solosky, Brooklyn Park, both of Minn.

[73] Assignee: Honeywell Inc., Minneapolis, Minn.

[21] Appl. No.: 772,401

[22] Filed: Oct. 7, 1991

[51] Int. Cl.[5] .................. G01B 7/14; G08C 19/06
[52] U.S. Cl. .................. 324/207.18; 324/207.24; 340/870.36
[58] Field of Search .............. 324/207.12, 207.15, 324/207.16, 207.18, 207.19, 207.24; 340/870.31, 870.32, 870.33, 870.34, 870.35, 870.36; 318/656, 657

[56] References Cited

U.S. PATENT DOCUMENTS 4,364,045 12/1982 Spiegel .................. 324/207.19

*Primary Examiner*—Walter E. Snow
*Attorney, Agent, or Firm*—Ronald F. Champion

[57] ABSTRACT

A position measurement device using a variable differential transducer. The primary of the transducer is supplied with a triangular pulse causing a similar pulse to be produced at the transducer secondary. The induced pulse is then compared with a constant reference voltage. Due to the triangular shape of the induced pulse, the time that the induced pulse is greater than the reference voltage is indicative of the magnitude of that pulse. The time period is then counted and communicated to subsequent devices.

12 Claims, 2 Drawing Sheets

POSITION MEASUREMENT SENSOR USING A LINEAR VARIABLE DIFFERENTIAL TRANSFORMER WITH A TRIANGULAR PULSE INPUT AND OUTPUT

FIELD OF THE INVENTION

The present invention involves a device to measure the physical position of an element. Specifically the movable core of a variable differential transformer is connected to the sensed element and electronic circuitry is used to determine the position of the core and thereby the position of the sensed element.

BACKGROUND OF THE INVENTION

The present invention relates to circuitry used along with a linear variable differential transducer (LVDT) to sense the position of some element. Specifically the invention provides circuitry and a method to sense the position of an element which is efficient, accurate, and uses small amounts of power.

To sense physical position of different devices it is common place to utilize a linear variable differential transducer (LVDT), which typically has a primary coil, a secondary coil and a core member that magnetically couples the primary coil to the secondary coil. The amount of magnetic coupling is dependent upon the position of the core within the transducer. By measuring the amount of magnetic coupling between the primary coil and the secondary coil, the position of the core member can be determined. Similarly, when the core member is attached to some element, the position of that element can also be determined by measuring the amount of magnetic coupling between the primary and secondary coils.

To measure the amount of magnetic coupling between the primary coil and the secondary coil, the primary coil is excited by an AC signal which creates an induced AC signal on the secondary coil. The induced AC signal on the secondary coil is then measured and compared with the AC signal used to excite the primary coil. The ratio of the induced AC signal at the secondary coil to the excitation signal is indicative of the amount of magnetic coupling provided by the core member. Since the amount of magnetic coupling provided by the core member is related to the position of the core member, the ratio indicating magnetic coupling is also indicative of the core member position.

Constant excitation of the primary coil by an AC signal creates problems. Specifically, a high amount of power is used due to constant excitation of the primary coil. Additionally, problems with cross modulation signals can become very severe when AC signals are utilized.

Recently square wave pulses have been used to excite the LVDT primary, along with appropriate time delays to eliminate the problems of noise associated with AC excitation. In this method of LVDT sampling, a square wave is used to drive the transformer primary, and a delay time is allowed to pass before the signal at the secondary is measured. This delay allows the signal at the secondary to stabilize sampling.

Typically, sampling of the secondary is accomplished by sample and hold circuits attached to each secondary coil. While this is an effective way to sample the secondary signal, it involves a large amount of circuitry.

SUMMARY OF THE INVENTION

The position measurement device of the present invention contains circuitry to generate a triangular wave pulse and transmit that pulse to a variable differential transformer. The variable differential transformer has a primary coil and a secondary coil, along with a moveable core member. The secondary coil and the primary coil are magnetically coupled by the moveable core member. The position of the moveable core member dictates the amount of magnetic coupling. Transmitting a triangular pulse to the primary coil causes an induced triangular pulse to be created at the secondary coil. The pulse at the secondary coil is then compared with a reference voltage and a time signal indicative of the relationship between the reference voltage and the transformer secondary signal is produced. Since the induced pulse is triangularly shaped, when it is compared with a constant reference the amount of time that the triangular pulse is greater than the reference will vary proportionally with the magnitude of the induced triangular pulse at the secondary coil. The duration of the time signal is measured and used to determine the position of the movable core member.

It is an object of the present invention to provide a position sensor which utilizes a variable differential transformer but requires much less power than typical position sensors using similar transformers. It is a further object of the present invention to provide means for determining the position of an element which requires a smaller amount of Circuitry. Lastly, it is a further object of the present invention to provide a position sensor that is compatible with digital systems.

BRIEF DESCRIPTION OF THE DRAWINGS

Further objects of the present invention will become apparent from detailed description in conjunction drawings in which.

DESCRIPTION OF THE INVENTION

The principles of the present invention can be used to sense the position of a number of elements by using a number of position sensors, each having a linear variable differential transformer associated therewith. The following description will describe the operation of a single position sensor. It is understood that the same principles apply to each of a plurality of position sensors if such a function is desired.

Figure 1:
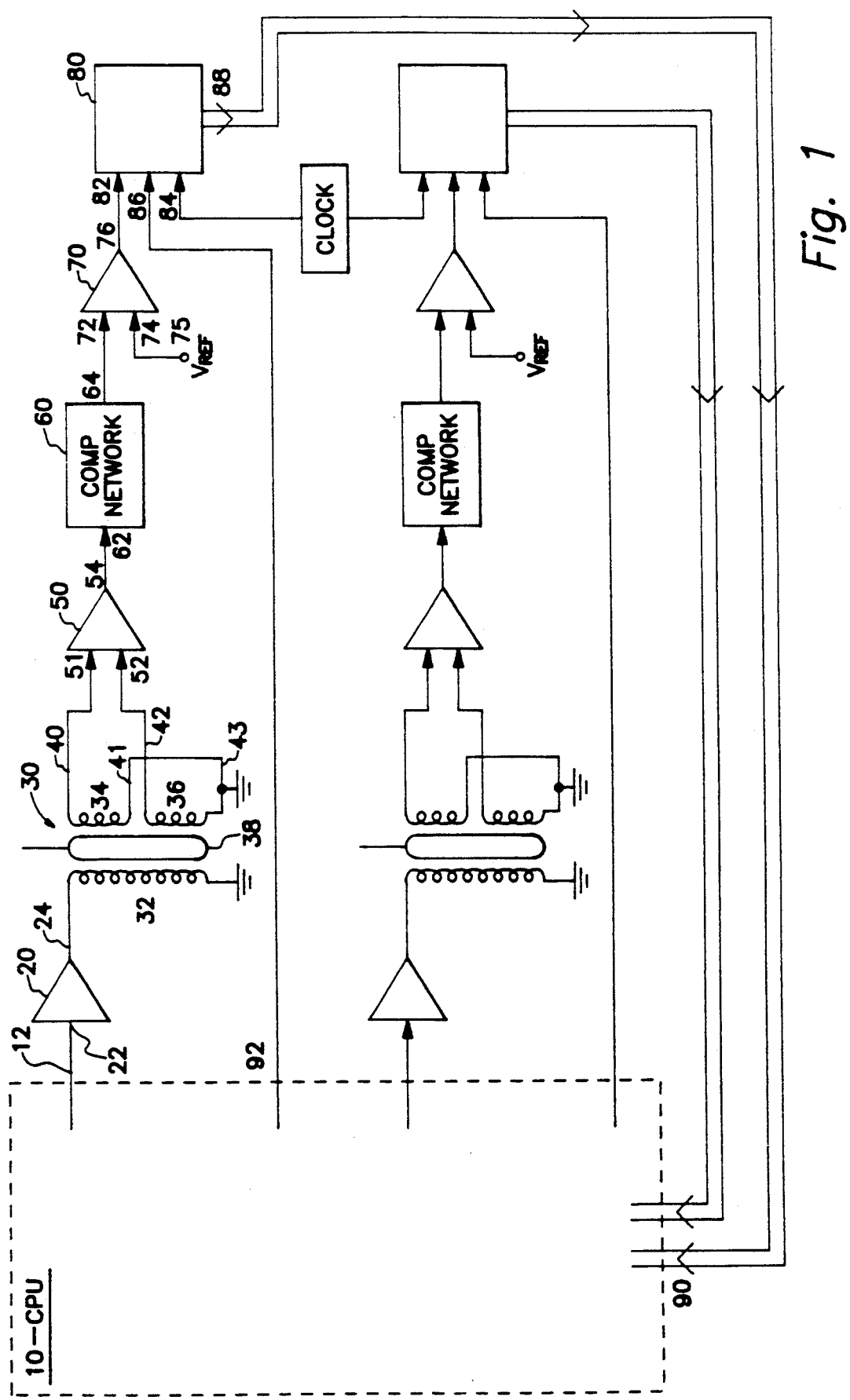
FIG. 1 schematically represents the circuitry of the present invention including a linear variable differential transducer.

Referring to FIG. 1, the position sensor utilizes a pulse generation means, microcontroller or microprocessor 10 to produce a pulse. This pulse is produced at a microprocessor signal output 12. Microprocessor signal output 12 is electrically connected to an input 22 of an amplifier 20. Amplifier 20 operates as an integrator (reset not shown) and a buffer, having its output 24 electrically connected to the primary coil 32 of a linear variable differential transformer 30 (LVDT 30).

Linear variable differential transformer 30 also has a pair of secondary coils, 34 and 36, and a movable core member 38. Secondary coils 34 and 36 are magnetically coupled to primary coil 32 by movable core member 38. The amount of coupling is dependent upon the position of movable core member 38. Secondary coils 34 and 36 each have a pair of terminals 40, 41, 42 and 43 respectively. Terminal 41 from coil 34 and terminal 43 from coil 36 are each connected to a common reference, while terminal 40 of coil 34 and terminal 42 of coil 36 are each connected to the inputs 51 and 52 of a summing amplifier 50.

Summing amplifier 50 has an output 54 which produces a pulse having a magnitude equal to the arithmetic sum of the magnitude of the pulses at summing amplifier inputs 51 and 52. Electrically connected to output 54 of summing amplifier 50 is a compensation network 60.

Compensation network 60 receives a pulse at its input 62, filters that signal, and adjusts the signal for distortion due to electromagnetic interference and line inductances. Compensation network 60 then outputs a substantially distortion free pulse at its output 64. Connected to compensation network output 64 is the signal input 72 of a comparator 70.

Comparator 70 further has a second input 74 electrically connected to a voltage reference 75. Comparator 70 generates a signal on its output 76 that is indicative of the relationship between the voltage signals at signal input 72 and second input 74. Comparator output 76 is then connected to the signal input 82 of a counter 80.

In addition to signal input 82, counter 80 has a clock input 84 and a reset input 86. Counter 80 counts the time period between voltage transitions on signal input 82 and produces a digital signal indicative of this time period. The signal indicative of the time between voltage transitions is communicated to further devices via the counter output 88.

To measure the position of some element, that element must be connected to movable core member 38 of LVDT 30. This connection allow movable core member 38 to move in conjunction with the element whose position is being sensed.

Figure 2:
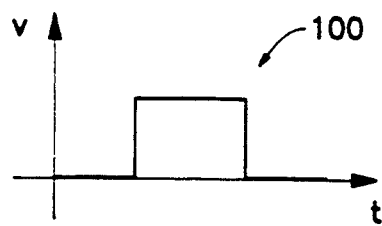
FIGS. 2-9 graphically represents the signals at different points in the circuit and their relationships to one another.
Figure 3:
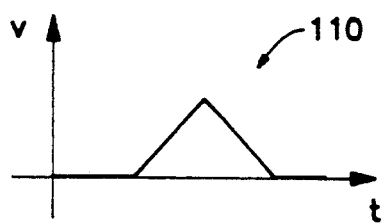
Figure 5:
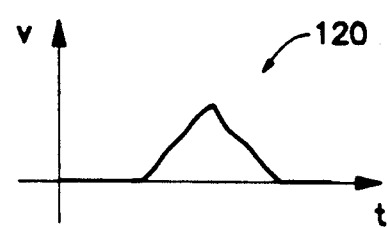
Figure 6:
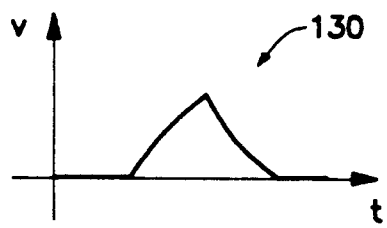

Each time the position of an element is desired, a pulse 100 is generated on microprocessor output 12. Pulse 100 is received by amplifier 20 at its input 22 and integrated, transforming pulse 100 into a triangular pulse 110. Referring to FIG. 2 initial pulse 100 at microprocessor output 12 is a square pulse. When amplifier 20 receives square pulse 100 and integrates it, the resulting signal is a triangular pulse 110 as represented in FIG. 3. This triangular pulse is then transmitted to the LVDT primary 30 for purposes of sensing the position of LVDT movable core member 38.

Figure 4:
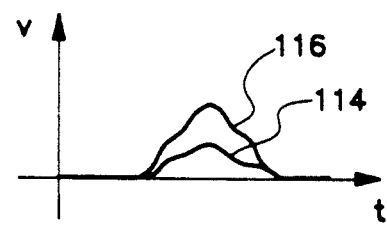

In response to triangular pulse 110 transmitted through LVDT primary 32, as shown in FIG. 3, a similar triangular pulse is induced at LVDT secondaries 34 and 36. As previously stated the secondaries are magnetically coupled with the primary by movable core member 38. The amount of coupling is dependent on the position of movable core member 38. Two substantially triangular pulses (Shown in FIG. 4.) will be present at secondary output terminals 40 and 42 and will thus be transmitted to summing amplifier inputs 51 and 52. Summing amplifier 50 mathematically adds the two pulses and produces a pulse 120 at output 54 equal in magnitude to the arithmetic sum of the magnitudes of the two pulses present at summing amp inputs 51 and 52.

Due to the electromagnetic interference (EMI), line inductances, and noise caused by filtering connections, pulse 120 present at summing amplifier output 54 may be somewhat distorted. Therefore, pulse 120 transmitted to compensation network 60. The pulse 120 is filtered and adjusted to eliminate the previously mentioned distortion. Compensation Network 60 has a gain of one from input to output and does not attentuate signals at all. A substantially distortion free triangular pulse 130 is then transmitted from compensation network output 64 to signal input 72 of comparator 70.

Comparator 70 constantly compares the voltage level of the signals at signal input 72 and second input 74. Comparator output 76 will be at one of two voltage levels dependent upon the relationship between the voltage levels present at signal input 72 and second input 74. When the voltage level at signal input 72 is lower than the voltage level at second input 74, comparator output 76 will be at a first predetermined voltage level. Conversely, when the voltage level at signal input 72 is greater than the voltage level at second input 74, the voltage level of comparator output 76 will be at a second predetermined level.

Figures 7, 8, 9:
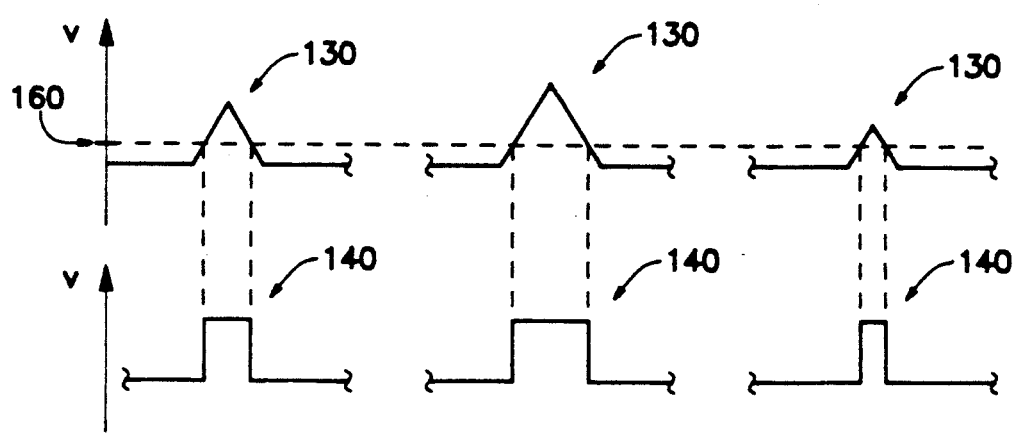

When the substantially distortion free triangular wave is transmitted from compensation network output 64 to signal input 72 a pulse is created at comparator output 76. Comparator output 76 will be at a first predetermined voltage level until pulse 130 ramps up to the level of the reference voltage. Comparator output 76 will switch to a second predetermined voltage level once pulse 130 has reached the level of the reference and will stay at the second predetermined level until pulse 130 drops below the reference voltage. An example of comparator 30 operation can be seen by referring to FIG. 7. The duration of this pulse will be dependent upon the magnitude of the triangular wave pulse and the voltage reference connected to comparator second input 74. The pulse at comparator output 76 will have a duration equal to the amount of time that a triangular wave pulse is above the reference voltage.

The magnitude of pulse 120 at the input of compensation means 60 and the magnitude of pulse 130 will be equal. The magnitude of pulse 120 and pulse 130 will be attenuated in comparison to the magnitude of pulse 110 produced by amplifier 20. The amount of attenuation will be dependent upon the position of movable core member 38 Although pulse 120 and pulse 130 are attenuated in relation to input pulse 110, these pulses 120, 130, will maintain their triangular shape. Comparing pulse 130 with a fixed reference level 150, creates a pulse 140 at comparator output 76 having a duration that will depend on the height of the triangular wave pulse. A triangular pulse with a greater magnitude will be greater than the reference voltage for a longer period of time than a triangular pulse with lesser magnitude. (See FIG. 8 & 9.) Therefore, the duration of pulse 140 at comparator output 76 will be proportional to the magnitude of the triangular pulse at comparator input. Further, the magnitude of the triangular pulse at comparator input is dependent upon the attenuation caused by movable core member 38. Therefore, the duration of the pulse at comparator output 76 is also proportional to the position of movable core member 38.

The pulse created at comparator output 76 is transmitted to counter signal input 82. Counter 80 counts the duration of the pulse at signal input 82 and produces a digital signal 150 at output 88 which can then be transmitted to a subsequent device. From this digital signal at counter output 88, calculations can be made to determine the position of LVDT movable core member 38.

In the present invention, microprocessor 10 will be used for a number of different tasks. Initially microprocessor 10 will generate the initial pulse at microprocessor pulse output 12. Microprocessor 10 Will also control the operation of the counter by resetting when necessary via microprocessor output 92, and receive the digital signal on counter output 88 at input 90 so further calculations can be made.

It will be understood by those skilled in the art that variations can be made in the specific implementation of this invention without departing from the scope and spirit of the invention.

What is claimed is:

1. A position measurement device comprising:
   a variable differential transformer having a primary coil, a secondary coil, and a movable core member, said secondary coil magnetically coupled with said primary coil by said movable core member, said movable core member also for attenuating a signal at said secondary in proportion to the position of said movable core member;
   signal generation means for creating a triangular pulse and transmitting said triangular pulse to said variable differential transformer primary coil;
   comparator means for comparing a voltage signal at said secondary coil with a reference voltage and producing an output signal, said output signal being at a first predefined voltage level when said secondary coil signal is smaller in magnitude than said reference voltage and said output voltage signal being at a second predefined voltage level when said output voltage signal is larger in magnitude than said reference voltage; and
   counter means for measuring the time period between voltage transitions on said comparator means output and producing a digital signal indicative of said time period.

2. The position measurement device of claim 1, further comprising:
   compensation means electrically connected between said secondary and said comparator for filtering and shaping the triangular pulse so as to eliminate distortion in the triangular wave.

3. The position measurement device of claim 1 wherein said pulse generation means is a microprocessor output terminal electrically connected to an amplifier, said microprocessor output terminal for producing a square wave pulse and said amplifier for integrating said square wave pulse and producing a triangular shaped pulse.

4. The position measurement device of claim 1 wherein said transducer has a plurality of secondary coils, each coil having two terminals, a first terminal being connected to a common ground potential and a second terminal connected to the inputs of a summing amplifier, said summing amplifier for producing a signal proportional to the arithmetic sum of the signals at said inputs.

5. A position measurement device comprising;
   a variable differential transformer having a primary coil, a secondary coil, and a movable core member, said secondary coil magnetically coupled with said primary coil by said movable core member, said movable core member also for attenuating a signal at said secondary coil in proportion to the position of said movable core member;
   means for producing an input pulse, said pulse having voltage transitions occurring over a finite period of time, said pulse producing means electrically connected to said transducer primary coil for communicating said input pulse to said primary coil;
   comparator means electrically connected to said secondary coil and a reference voltage signal, said comparator means for comparing the voltage level at said secondary coil with said reference voltage signal, said comparator means outputs first predetermined voltage level and a second predetermined voltage level dependent upon the relationship between said reference voltage and said secondary coil voltage level; and
   counting means electrically connected to said comparator means output, said counter means for counting the time between consecutive transitions on said comparator means output, said counter means having an output to communicate said time count to subsequent devices.

6. The position measurement device of claim 5, wherein said means for producing an output pulse is a microprocessor output.

7. The position measurement device of claim 5, further comprising:
   compensation means electrically connected between said secondary and said comparator for filtering and shaping the triangular pulse so as to eliminate distortion in the triangular pulse and produce a substantially distortion free triangular pulse.

8. The position measurement device of claim 5 wherein said transducer has a plurality of secondary coils, each secondary coil having two terminals, a first terminal being connected to a common ground potential and a second terminal connected to the inputs of a summing amplifier, said summing amplifier for producing a signal proportional to the arithmetic sum of the signals at said inputs.

9. The position measurement device of claim 5 wherein said counter means is contained within a microprocessor.

10. A position measuring device, comprising:
    microprocessor means having an output and an input, said microprocessor means for producing a square pulse at said output and for measuring the time duration of pulses at said input;
    integrator means electrically connected to said microprocessor output for integrating said square pulse and producing a triangular pulse at an integrator means output;
    a variable differential transformer having a primary coil, a secondary coil, and a movable core member, said secondary coil magnetically coupled with said primary coil by said movable core member, said movable core member also for attenuating a signal at said secondary in proportion to the position of said movable core member, said primary electrically connected to said integrator means output; and,
    compensation means electrically connected to said transformer secondary for filtering and shaping the induced triangle wave and producing a substantially distortion free triangular pulse at an output;
    comparator means having a signal input electrically connected to said compensation means output for comparing the voltage level present at said signal input with a predetermined reference voltage and for producing a pulse at an output having a duration equal to the amount of time that said voltage level at said signal input is greater than said predetermined reference voltage; and counter means electrically connected to said comparator output for measuring the time period between voltage transitions on said comparator means output and producing a digital signal indicative of said time period.

11. A method for determining the position of a device comprising the steps of:
  a. generating a triangular pulse;
  b. transmitting said triangular pulse to a variable differential transducer which will produce an induced triangular pulse at an output;
  c. comparing said induced triangular pulse to a predetermined reference voltage and producing a timing pulse having a duration equal to the amount of time that said induced triangular pulse is greater than said predetermined reference voltage; and
  d. counting the time duration of said timing pulse and producing a digital signal indicative of said time duration.

12. A method for determining the position of a device comprising the steps of:
  a. producing a square pulse;
  b. integrating said square pulse thus producing a pulse having a triangular shape;
  c. transmitting said triangular pulse to a variable differential transducer which will produce an induced triangular pulse at an output;
  d. compensating said induced triangular pulse for distortion and producing a substantially distortion free triangular pulse having a magnitude equal to said induced triangular pulse;
  e. comparing said substantially distortion free triangular pulse to a predetermined reference voltage and producing a timing pulse having a duration equal to the amount of time that said substantially distortion free triangular pulse is greater than said predetermined reference voltage; and
  f. counting the time duration of said timing pulse and producing a digital signal indicative of said time duration.

* * * * *